US011836500B2

(12) United States Patent
Suryanarayana et al.

(10) Patent No.: US 11,836,500 B2
(45) Date of Patent: Dec. 5, 2023

(54) SYSTEMS AND METHODS FOR BASIC INPUT/OUTPUT SYSTEM DRIVER OFFLINE PROTOCOL

(71) Applicant: Dell Products L.P., Round Rock, TX (US)

(72) Inventors: Shekar Babu Suryanarayana, Bangalore (IN); Ibrahim Sayyed, Georgetown, TX (US); Jagadish Babu Jonnada, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 102 days.

(21) Appl. No.: 17/662,247

(22) Filed: May 6, 2022

(65) Prior Publication Data

US 2023/0359465 A1 Nov. 9, 2023

(51) Int. Cl.
*G06F 9/4401* (2018.01)
*G06F 9/445* (2018.01)

(52) U.S. Cl.
CPC ........ *G06F 9/4403* (2013.01); *G06F 9/44526* (2013.01)

(58) Field of Classification Search
CPC ............................ G06F 9/4403; G06F 9/44526
USPC ............................................................. 713/1
See application file for complete search history.

(56) References Cited

U.S. PATENT DOCUMENTS

| 5,471,617 | A | * | 11/1995 | Farrand | G06F 11/2294 714/E11.201 |
|---|---|---|---|---|---|
| 5,978,912 | A | * | 11/1999 | Rakavy | G06F 11/2294 709/222 |
| 11,138,141 | B1 | * | 10/2021 | Sendelbach | G06T 1/20 |
| 2003/0097581 | A1 | * | 5/2003 | Zimmer | G06F 9/4411 726/10 |
| 2003/0188173 | A1 | * | 10/2003 | Zimmer | G06F 21/57 713/189 |
| 2004/0103299 | A1 | * | 5/2004 | Zimmer | G06F 9/4416 713/193 |
| 2004/0268107 | A1 | * | 12/2004 | Zimmer | G06F 9/4408 713/1 |
| 2004/0268108 | A1 | * | 12/2004 | Chen | G06F 15/177 713/1 |
| 2004/0268141 | A1 | * | 12/2004 | Zimmer | G06F 21/575 726/17 |
| 2005/0108511 | A1 | * | 5/2005 | Zimmer | G06F 9/4411 713/1 |

(Continued)

*Primary Examiner* — Paul R. Myers
(74) *Attorney, Agent, or Firm* — Jackson Walker L.L.P

(57) ABSTRACT

A method may include during a Pre-Extensible Firmware Interface Initialization phase of a BIOS, receiving a mailbox command from a management controller of an information handling system, the mailbox command including information regarding a driver image stored in computer-readable media associated with the BIOS, the information including uniquely-identifying information for the driver image. The method may also include, during a Driver Execution Environment phase of the BIOS, locating the driver image stored in the computer-readable media, verifying the driver image based on the information from the mailbox command, extracting the driver image from the computer-readable media in response to verifying the driver image, and causing a driver stored within the driver image to load and execute during BIOS execution.

18 Claims, 3 Drawing Sheets

(56) References Cited

U.S. PATENT DOCUMENTS

| | | | |
|---|---|---|---|
| 2006/0117325 A1* | 6/2006 | Wieland | G06F 9/468 |
| | | | 719/321 |
| 2006/0224878 A1* | 10/2006 | Datta | G06F 21/575 |
| | | | 713/2 |
| 2007/0214349 A1* | 9/2007 | Gu | G06F 1/3203 |
| | | | 713/2 |
| 2010/0318778 A1* | 12/2010 | Jones | G06F 9/4411 |
| | | | 713/1 |
| 2011/0302444 A1* | 12/2011 | Tashima | G06F 9/4411 |
| | | | 714/2 |
| 2012/0255002 A1* | 10/2012 | Sallam | G06F 21/566 |
| | | | 726/23 |
| 2014/0365755 A1* | 12/2014 | Liu | G06F 21/572 |
| | | | 713/2 |
| 2016/0180094 A1* | 6/2016 | Dasar | G06F 9/4406 |
| | | | 714/36 |
| 2016/0253501 A1* | 9/2016 | Wynn | G06F 8/61 |
| | | | 726/23 |
| 2016/0275291 A1* | 9/2016 | Campbell | G06F 16/252 |
| 2017/0243021 A1* | 8/2017 | Gupta | G06F 21/6218 |
| 2019/0095220 A1* | 3/2019 | Iyengar | G06F 9/4405 |
| 2019/0332425 A1* | 10/2019 | Narayana | G06F 9/3851 |
| 2020/0356357 A1* | 11/2020 | Narasimhan | G06F 15/167 |
| 2020/0363974 A1* | 11/2020 | Wei | G06F 3/0604 |
| 2023/0032359 A1* | 2/2023 | Giri | H04L 9/3247 |
| 2023/0100899 A1* | 3/2023 | Sayyed | G06F 9/4411 |
| | | | 713/2 |
| 2023/0195473 A1* | 6/2023 | Li | G06F 21/85 |
| | | | 713/2 |

* cited by examiner

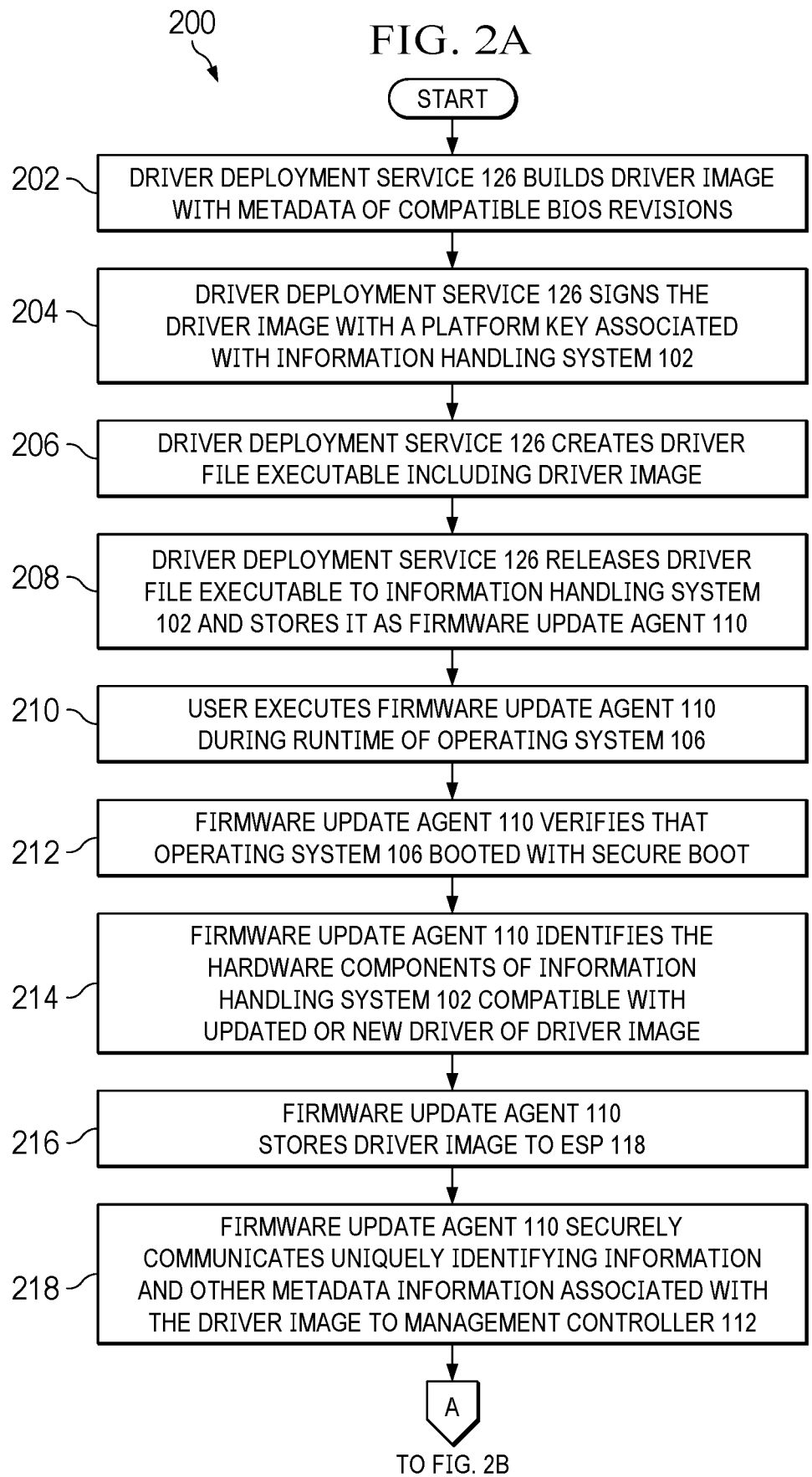

SYSTEMS AND METHODS FOR BASIC INPUT/OUTPUT SYSTEM DRIVER OFFLINE PROTOCOL

TECHNICAL FIELD

The present disclosure relates in general to information handling systems, and more particularly to systems and method for enabling an offline protocol for updating drivers of a basic input/output system (BIOS).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A critical component of modern information handling systems is the BIOS. A BIOS may comprise boot firmware configured to be the first code executed by a processor of an information handling system when the information handling system is booted and/or powered on, and serves to initialize information handling resources of the information handling system and/or initialize interoperation of the information handling system with other information handling systems. In addition to BIOS, an information handling system may include critical firmware for one or more other components of the information handling system.

Traditionally, updating a BIOS to add a new feature to support new hardware, to fix a bug, or to add security revisions requires a new version build or "spin" of the BIOS. However, despite the advantages and criticality of BIOS updates, many problems and disadvantages occur with respect to BIOS updates.

For example, spinning a new BIOS may be costly in terms of time and money to information handling system manufacturers as such spin may require a full validation cycle to core and value-added features testing. Further, even after the update, spin, and validation efforts, customers/end users are often slow or reluctant to adapt to new BIOS updates. Accordingly, it may be desirable to be able to securely update a BIOS without requiring spinning of a new BIOS.

SUMMARY

In accordance with the teachings of the present disclosure, the disadvantages and problems associated with existing approaches to updating a BIOS may be reduced or eliminated.

In accordance with embodiments of the present disclosure, an information handling system may include a processor, a memory communicatively coupled to the processor, and a basic input/output system (BIOS) communicatively coupled to the processor and comprising a program of executable instructions configured to, when read and executed by the processor during a Pre-Extensible Firmware Interface Initialization phase of the BIOS, receive a mailbox command from a management controller of the information handling system, the mailbox command including information regarding a driver image stored in computer-readable media associated with the BIOS, the information including uniquely-identifying information for the driver image. The BIOS may also be configured to, during a Driver Execution Environment phase of the BIOS, locate the driver image stored in the computer-readable media, verify the driver image based on the information from the mailbox command, extract the driver image from the computer-readable media in response to verifying the driver image, and cause a driver stored within the driver image to load and execute during BIOS execution.

In accordance with these and other embodiments of the present disclosure, a method may include during a Pre-Extensible Firmware Interface Initialization phase of a BIOS, receiving a mailbox command from a management controller of an information handling system, the mailbox command including information regarding a driver image stored in computer-readable media associated with the BIOS, the information including uniquely-identifying information for the driver image. The method may also include, during a Driver Execution Environment phase of the BIOS, locating the driver image stored in the computer-readable media, verifying the driver image based on the information from the mailbox command, extracting the driver image from the computer-readable media in response to verifying the driver image, and causing a driver stored within the driver image to load and execute during BIOS execution.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, during a Pre-Extensible Firmware Interface Initialization phase of a BIOS, receive a mailbox command from a management controller of an information handling system, the mailbox command including information regarding a driver image stored in a storage partition associated with the BIOS, the information including uniquely-identifying information for the driver image. The program of instructions may further cause the processor to, during a Driver Execution Environment phase of the BIOS, locate the driver image stored in the computer-readable media, verify the driver image based on the information from the mailbox command, extract the driver image from the computer-readable media in response to verifying the driver image, and cause a driver stored within the driver image to load and execute during BIOS execution.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2A and 2B (which may be referred to herein collectively as "FIG. 2") illustrate a flowchart of an example method for enabling a BIOS driver offline protocol, in accordance with embodiments of the present disclosure.

DETAILED DESCRIPTION

Figure 1:
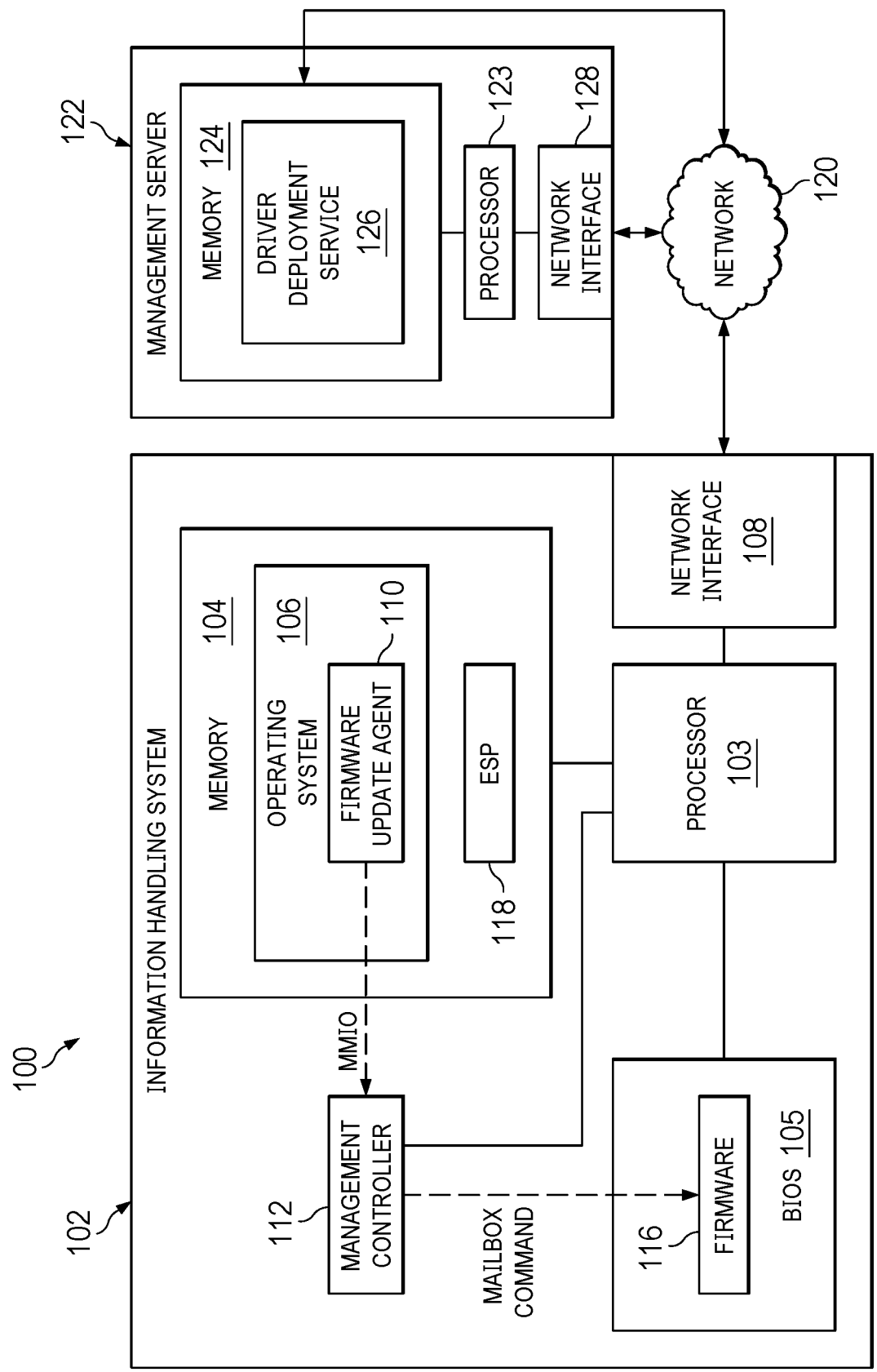
FIG. 1 illustrates a block diagram of an example system for enabling a BIOS driver offline protocol, in accordance with embodiments of the present disclosure.
Figure 2B:
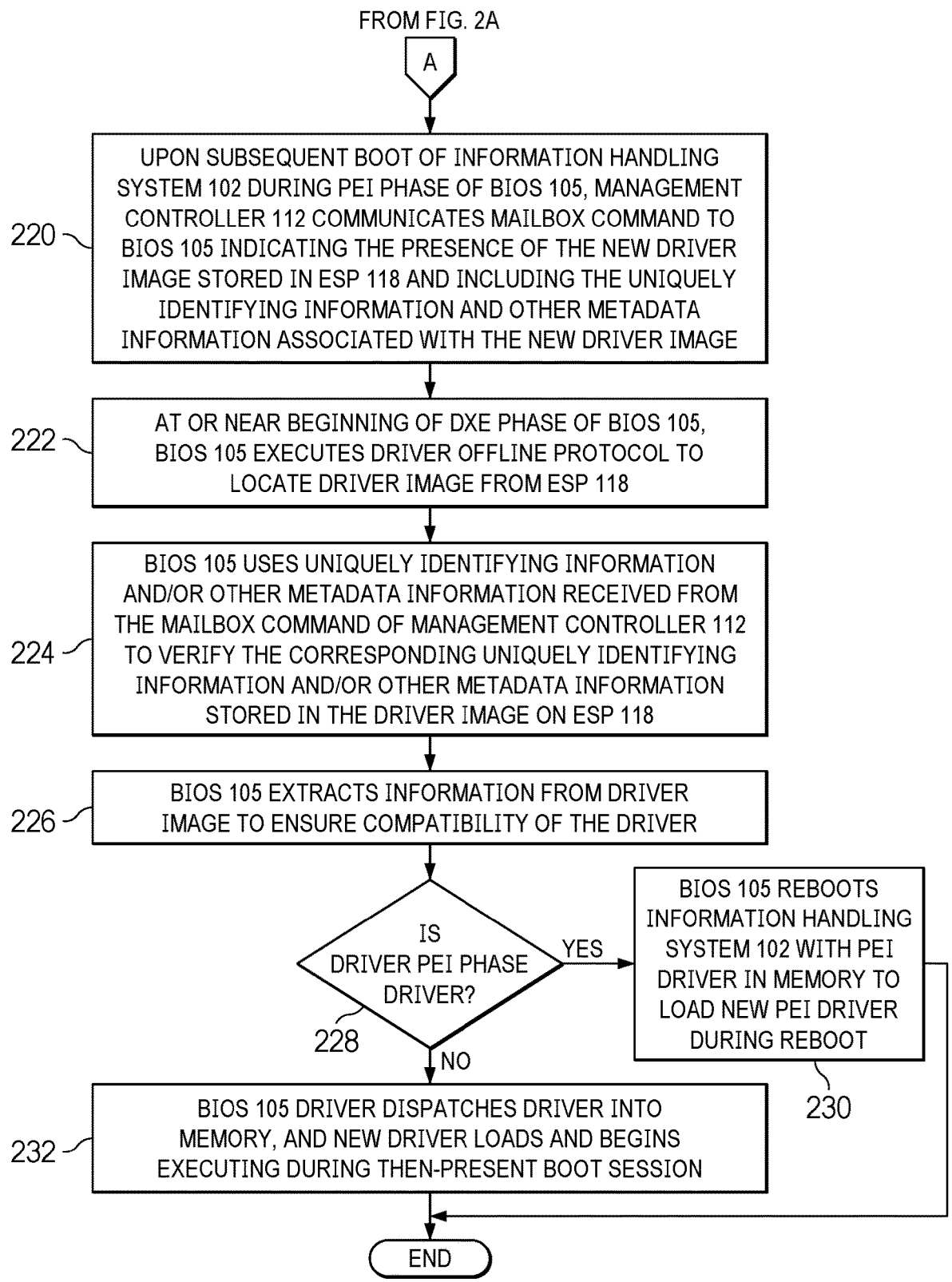

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for enabling a BIOS driver offline protocol, in accordance with embodiments of the present disclosure. As shown in FIG. 1, system 100 may include information handling system 102, network 120, and management server 122.

In some embodiments, an information handling system 102 may comprise a personal computer. In some embodiments, an information handling system 102 may comprise or be an integral part of a server. In other embodiments, an information handling system 102 may comprise a portable information handling system (e.g., a laptop or notebook, etc.). As depicted in FIG. 1, an information handling system 102 may include a processor 103, a memory 104 communicatively coupled to processor 103, a BIOS 105 communicatively coupled to processor 103, a management controller 112 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

As shown in FIG. 1, operating system 106 may have embodied therein a firmware update agent 110. Firmware update agent 110 may comprise any suitable program of instructions that is a component of operating system 106 or an application program configured to run on operating system 106, and may be configured to, when read and executed by processor 103, verify the secure boot of operating system 106 and securely communicate uniquely identifying information associated with a BIOS firmware update to management controller 112, as described in greater detail below.

As also shown in FIG. 1, memory 104 may also have stored thereon an Extensible Firmware Interface (EFI) Storage Partition (ESP) 118, which may be stored in a non-volatile portion of memory 104 (e.g., Serial Peripheral Interface read-only memory). ESP 118 may comprise any suitable partition on a computer-readable medium (e.g., a hard disk drive or solid-state drive) that BIOS 105 may use to load installed operating systems and/or various utilities. For example, ESP 118 may include boot loaders or kernel images for all installed operating systems stored in other partitions (e.g., operating system 106), device driver files for hardware devices present in information handling system 102 and used by firmware 116 at boot time, system utility programs that are intended to be executed before an operating system is booted, data files such as error logs, etc.

BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102. As shown in FIG. 1, BIOS 105 may include firmware 116.

Firmware 116 may comprise any program of executable instructions, or aggregation of programs of executable instructions, configured to implement BIOS 105 and its functionality. Accordingly, firmware 116 may include the core executable code of BIOS 105.

Management controller 112 may be configured to provide out-of-band management facilities for management of information handling system 102. Such management may be made by management controller 112 even if information handling system 102 is powered off or powered to a standby state. Accordingly, in some embodiments, such management may be made through a dedicated management communications channel which may be physically and/or logically isolated from an "in-band" communications channel used by a host system of information handling system 102 when powered on. In certain embodiments, management controller 112 may include or may be an integral part of a baseboard management controller (BMC), a remote access controller (e.g., a Dell Remote Access Controller or Integrated Dell Remote Access Controller), or an enclosure controller (EC). In other embodiments, management controller 112 may include or may be an integral part of a chassis management controller (CMC).

In accordance with the present disclosure, management controller 112 may be configured to, in connection with a driver update, receive uniquely identifying information associated with a BIOS firmware update from firmware update agent 110 and communicate a mailbox command to BIOS firmware 116, as described in greater detail below.

Network interface 108 may comprise any suitable system, apparatus, or device operable to serve as an interface between information handling system 102 and one or more other information handling systems via an in-band management network. Network interface 108 may enable information handling system 102 to communicate using any suitable transmission protocol and/or standard. In these and other embodiments, network interface 108 may comprise a network interface card, or "NIC." In some embodiments, network interface 108 may comprise a 10 gigabit Ethernet network interface. In these and other embodiments, network interface 108 may be enabled as a local area network (LAN)-on-motherboard (LOM) card. Network interface 108 may be configured to communicate via wire-line transmissions, wireless transmission, or both.

In addition to processor 103, memory 104, BIOS 105, management controller 112, and network interface 108, information handling system 102 may include one or more other information handling resources.

Network 120 may be a network and/or fabric configured to couple information handling system 102, management server 122, and/or one or more other information handling systems to one another. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Management server 122 may comprise any information handling system including requisite hardware, software, and/or firmware for interfacing information handling system 102 via network 120 in order to perform end-to-end workload modeling, as described in greater detail below.

As depicted in FIG. 1, management server 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of management server 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to management server 122 is turned off.

As shown in FIG. 1, memory 124 may have a driver deployment service 126 stored thereon. Driver deployment service 126 may comprise any suitable program of instructions configured to, when loaded by processor 123 from memory 124, build driver images and manage deployment of driver images to information handling system 102 via network 120, as set forth in greater detail below.

Network interface 128 may comprise any suitable system, apparatus, or device operable to serve as an interface between management server 122 and network 120. Network interface 128 may enable management server 122 to communicate using any suitable transmission protocol and/or standard, including any of the protocols and/or standards described above with respect to network 120. In these and other embodiments, network interface 128 may comprise a NIC.

In addition to information handling system 102, network 120, and management server 122, system 100 may include one or more other information handling resources.

FIG. 2 illustrates a flowchart of an example method 200 for enabling a BIOS driver offline protocol, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, driver deployment service 126 may build a driver image with metadata of compatible BIOS revisions, along with core dependency protocol unique identifiers (e.g., global unique identifiers or "GUIDs") with the order of driver loading inside the BIOS driver framework. In some embodiments, driver deployment service 126 may add a publisher file inside the driver image to identify the driver owner. At step 204, driver deployment service 126 may sign the driver image with a platform key associated with information handling system 102.

At step 206, driver deployment service 126 may create a driver file executable including the driver image. At step 208, driver deployment service 126 may release the driver file executable to information handling system 102, delivering such driver file executable to information handling system 102 via a "push" or in response to a "pull" request from information handling system 102. Upon receipt of the driver file executable, the driver file executable may be stored in memory 104 as firmware update agent 110.

At step 210, a user (e.g., end user or administrator) may execute firmware update agent 110 during runtime of operating system 106. At step 212, firmware update agent 110 may verify that operating system 106 booted with secure boot, to ensure that the firmware update is secure.

At step 214, the firmware update agent 110 may identify the hardware components of information handling system 102 compatible with the updated or new driver of the driver image. At step 216, if the updated/new driver is compatible with the hardware components of information handling system 102, firmware update agent 110 may store the driver image to ESP 118.

At step 218, firmware update agent 110 may securely communicate uniquely identifying information (e.g., a GUID) and other metadata information (e.g., driver image location, file name, etc.) associated with the driver image to management controller 112. For example, such communication may leverage existing known solutions for securely communicating memory-mapped input/output (MMIO) commands from an operating system to a management controller.

At step 220, upon a subsequent boot of information handling system 102 and during the Pre-EFI Execution Initialization (PEI) phase of BIOS 105, management controller 112 may communicate a mailbox command to BIOS 105 indicating the presence of the new driver image stored in ESP 118 and including the uniquely identifying information and other metadata information associated with the new driver image.

At step 222, at or near the beginning of the Driver Execution Environment (DXE) phase of BIOS 105, BIOS 105 may execute a driver offline protocol to locate the driver image from ESP 118. At step 224, BIOS 105 may use the uniquely identifying information and/or other metadata information received from the mailbox command of management controller 112 to verify the corresponding uniquely identifying information and/or other metadata information stored in the driver image on ESP 118. At step 226, assuming that the driver image is verified, BIOS 105 may extract information from the driver image (e.g., BIOS revision, dependency information, etc.) to ensure compatibility of the driver.

At step 228, BIOS 105 may determine if the driver is a PEI phase driver or a DXE phase driver. If a PEI phase driver, method 200 may proceed to step 230. If a DXE phase driver, method 200 may proceed to step 232.

At step 230, BIOS 105 may reboot information handling system 102 with the PEI driver in memory to load the new PEI driver during the reboot. After step 230, method 200 may end.

At step 232, BIOS 105 may dispatch the driver into memory, and the new driver may load and begin executing during the then-present boot session. After step 232, method 200 may end.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, management server 122, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor;
a memory communicatively coupled to the processor; and
a basic input/output system (BIOS) communicatively coupled to the processor and comprising a program of executable instructions configured to, when read and executed by the processor:
during a Pre-Extensible Firmware Interface Initialization phase of the BIOS, receive a mailbox command from a management controller of the information handling system, the mailbox command including information regarding a driver image stored in computer-readable media associated with the BIOS, the information including uniquely-identifying information for the driver image; and
during a Driver Execution Environment phase of the BIOS:
locate the driver image stored in the computer-readable media;
verify the driver image based on the information from the mailbox command;
extract the driver image from the computer-readable media in response to verifying the driver image; and
cause a driver stored within the driver image to load and execute during BIOS execution.

2. The information handling system of claim 1, wherein the computer-readable media comprises an Extensible Firmware Interface storage partition.

3. The information handling system of claim 1, wherein the mailbox command is a memory-mapped input/output command.

4. The information handling system of claim 1, further comprising an operating system embodied in the memory and configured to, when executed by the processor:
receive an executable file including the driver image; and
during execution of the operating system, execute the executable file and store the driver image to the computer-readable medium.

5. The information handling system of claim 1, wherein causing the driver image to load and execute during BIOS execution comprises, in response to determining that the driver is a Pre-Extensible Firmware Interface Initialization phase driver, causing the BIOS to reboot and execute the driver in the Pre-Extensible Firmware Interface Initialization phase after BIOS execution after the reboot.

6. The information handling system of claim 1, wherein causing the driver image to load and execute during BIOS execution comprises, in response to determining that the driver is a Driver Execution Environment phase driver, causing the BIOS to execute the driver within the then-current boot session of the BIOS.

7. A method comprising:
during a Pre-Extensible Firmware Interface Initialization phase of a BIOS, receiving a mailbox command from a management controller of an information handling system, the mailbox command including information regarding a driver image stored in computer-readable media associated with the BIOS, the information including uniquely-identifying information for the driver image; and
during a Driver Execution Environment phase of the BIOS:
locating the driver image stored in the computer-readable media;
verifying the driver image based on the information from the mailbox command;
extracting the driver image from the computer-readable media in response to verifying the driver image; and
causing a driver stored within the driver image to load and execute during BIOS execution.

8. The method of claim 7, wherein the computer-readable media comprises an Extensible Firmware Interface storage partition.

9. The method of claim 7, wherein the mailbox command is a memory-mapped input/output command.

10. The method of claim 7 further comprising, in an operating system embodied in a memory of the information handling system:
  receiving an executable file including the driver image; and
  during execution of the operating system, executing the executable file and store the driver image to the computer-readable medium.

11. The method of claim 7, wherein causing the driver image to load and execute during BIOS execution comprises, in response to determining that the driver is a Pre-Extensible Firmware Interface Initialization phase driver, causing the BIOS to reboot and execute the driver in the Pre-Extensible Firmware Interface Initialization phase after BIOS execution after the reboot.

12. The method of claim 7, wherein causing the driver image to load and execute during BIOS execution comprises, in response to determining that the driver is a Driver Execution Environment phase driver, causing the BIOS to execute the driver within the then-current boot session of the BIOS.

13. An article of manufacture comprising:
  a non-transitory computer-readable medium; and
  computer-executable instructions carried on the computer-readable medium, the instructions readable by a processor, the instructions, when read and executed, for causing the processor to:
    during a Pre-Extensible Firmware Interface Initialization phase of a BIOS, receive a mailbox command from a management controller of an information handling system, the mailbox command including information regarding a driver image stored in a storage partition associated with the BIOS, the information including uniquely-identifying information for the driver image; and
    during a Driver Execution Environment phase of the BIOS:
      locate the driver image stored in the computer-readable media;
      verify the driver image based on the information from the mailbox command;
      extract the driver image from the computer-readable media in response to verifying the driver image; and
      cause a driver stored within the driver image to load and execute during BIOS execution.

14. The article of claim 13, wherein the storage partition comprises an Extensible Firmware Interface storage partition.

15. The article of claim 13, wherein the mailbox command is a memory-mapped input/output command.

16. The article of claim 13, wherein the driver image is stored in the storage partition by an operating system embodied in a memory of the information handling system, and wherein the operating system is configured to:
  receive an executable file including the driver image; and
  during execution of the operating system, execute the executable file and store the driver image to the computer-readable medium.

17. The article of claim 13, wherein causing the driver image to load and execute during BIOS execution comprises, in response to determining that the driver is a Pre-Extensible Firmware Interface Initialization phase driver, causing the BIOS to reboot and execute the driver in the Pre-Extensible Firmware Interface Initialization phase after BIOS execution after the reboot.

18. The article of claim 13, wherein causing the driver image to load and execute during BIOS execution comprises, in response to determining that the driver is a Driver Execution Environment phase driver, causing the BIOS to execute the driver within the then-current boot session of the BIOS.

* * * * *